United States Patent

[11] 3,622,981

[72] Inventor Morton M. Greenbaum
New York, N.Y.
[21] Appl. No. 7,819
[22] Filed Feb. 2, 1970
[45] Patented Nov. 23, 1971
[73] Assignee Heuristic Concepts Inc.
Westwood, N.J.

[54] MAGNETIC TAPE RECORDING SYSTEM AND APPARATUS
10 Claims, 4 Drawing Figs.

[52] U.S. Cl. .................... 340/146.1, 340/174.1 B
[51] Int. Cl. .................... G06f 11/10
[50] Field of Search .................... 340/146.1, 174.1, 174.1 B; 235/153; 346/74

[56] References Cited
UNITED STATES PATENTS

| | | | |
|---|---|---|---|
| 3,454,930 | 7/1969 | Schoeneman | 340/174.1 X |
| 2,851,676 | 9/1958 | Woodcock et al. | 340/174.1 |
| 2,886,398 | 5/1959 | Rockwell | 340/174.1 X |
| 3,275,208 | 9/1966 | Poumakis | 340/174.1 X |
| 3,465,349 | 9/1969 | Schoeneman | 340/174.1 X |

*Primary Examiner*—Charles E. Atkinson
*Attorney*—Watson, Leavenworth & Kelton

ABSTRACT: A system providing a computer-compatible record bearing information signals with parity indication therefor and bearing further parity indication in the absence of recorded information signals. Alternately operating apparatus provide such continuous parity indication, one apparatus being responsive to record movement and thus permitting elimination of incremental tape movement apparatus.

MAGNETIC TAPE RECORDING SYSTEM AND APPARATUS

FIELD OF THE INVENTION

This invention relates to data recording and more particularly to a system adapted to receive randomly occurring data signals and to provide a record thereof exhibiting a signal recordation format compatible with existing digital computers.

BACKGROUND OF THE INVENTION

In order to function as an input-output (I/O) option of current digital computers, recording systems are required to provide a record exhibiting computer-compatible signal recordation format wherein recorded signals are particularly encoded, wherein recorded signals are precisely located within successive magnetic tape recordation frames, and wherein each recordation frame exhibits correct parity. Said particular encoding, typically "IBM MT/ST," hereinafter MT/ST, is readily provided by known encoders operatively responsive to input information in diverse (non-MT/ST) code, and generating an eight-bit MT/ST-encoded signal pattern of ones (HI-signal amplitude) and zeros (LO-signal amplitude) indicative of input information. For error control purposes a ninth or parity-bit signal is also generated to provide a nine-bit signal pattern of MT/ST bits and a parity-bit. Where odd-parity is employed, known circuit means are incorporated in association with the encoder for selectively entering a one in said parity-bit position such that all nine-bit recorded signal patterns include an odd number of total ones.

Said precise recorded signal location format characteristic is provided by controlled incremental advance of the magnetic tape, such that each frame in the succession of spaced recordation frames of the tape is carefully positioned with respect to recording heads receiving said nine-bit signal pattern prior to generation of a recordation command signal whereupon the signal pattern is entered in the multiple recording tracks of the tape. Various fast-acting tape drive capstans and electromagnetic braking systems are commonly employed to start and stop the tape with precision, a slack tape loop being often maintained between the recording heads and the tape feed reel or the tape takeup reel.

As respects said last-mentioned recordation format characteristic, in presently known recording systems, each successive recordation frame between start and end of a message contains a recordation exhibiting correct parity. This format characteristic is required since digital computers identify recordation frames not exhibiting correct parity to constitute errors, and, upon such occurrence, will abort, i.e., reject the entire message. Whereas erroneous aborts would result from failure to record true parity in a recordation frame, or to skip a recordation frame, this format characteristic is readily provided in presently known magnetic recordation systems serving as primary input-output options for digital computers by virtue of the mode of operation of the incremental tape advance means described above. In such operating mode, the tape is incrementally advanced to the next recordation frame only after occurrence of said recordation command signal and the tape remains in such advanced position until after a further like command is generated. On the other hand, precisely by reason of the need for incremental tape advance means for accommodation of the latter two said recordation format characteristics, presently known recordation providing such characteristics are nonportable, fixed location systems incorporating electromechanical tape transport apparatus which is complex, costly and of substantial size. Despite having these disadvantages such systems are nevertheless in primary use in light of the limited read-in speed capability of other existing I/O options. Thus, once loaded "off-line" in asynchronous manner by recording randomly occurring information, these recording systems are placed "on-line" and recorded information is read into the computer synchronously and at speed conserving of valuable computer time.

Said randomly occurring information recorded by such known systems is provided by associated apparatus, such as, paper tape readers, punched card readers, etc., all having said asynchronous operational character. The information is presented to this associated apparatus by still further apparatus, such as, paper tape and card punchers operated in conjunction with raw information manuscripts of inventory and the like. Thus, a further disadvantage of presently known recording systems is their requirement for extensive associated apparatus and operator time in accumulating and processing information to be recorded.

In view of the foregoing considerations, there exists substantial present need for a recording system having sufficient portability to accommodate field use directly at the source of raw information, having low cost and limited electromechanical complexity, requiring less extensive associated apparatus and, of course, providing recordings exhibiting said recordation format characteristics compatible with existing digital computers. Whereas various portable data recorders having digital signal recordation capability are presently known, as typified by U.S. Pat. Nos. 3,413,624 to Murdoch et al., 3,405,402 to Smith-Vaniz, 3,401,396 to Wolf et al., and 3,323,132 to Davis et al., none thereof contemplates or provides said recordation format characteristics essential to satisfaction of said present need.

SUMMARY OF THE INVENTION

It is an object of the present invention to provide system and apparatus adapted to record information in a recordation signal format compatible with existing digital computers.

It is a more particular object of this invention to provide a portable recordation system and apparatus adapted to record asynchronously occurring information signals in format compatible with existing digital computers.

It is a further object of this invention to provide economical recordation system and apparatus having the above capability and not requiring incremental tape advance means.

It is an additional object of this invention to provide recordation system and apparatus having the above capability and adapted for use in conjunction with simplified associated apparatus generating said asynchronously occurring information signals.

In the efficient attainment of the above and other objects, a recording system is provided in the present invention for producing a multitrack recording inclusive of a parity indication track comprising first means operatively responsive to a recordation command signal to generate signals indicative of character and auxiliary information, second means generating a parity signal in accordance with said first means generated signals, third means applying said generated parity signal to said record parity indication track and applying said first means generated signals to other record tracks, fourth means sensing movements of said record and generating output signals each indicative of record movement of a predetermined amount, and fifth means selectively applying said fourth means output signals to said record parity track upon occurrence of same and concurrent nonoccurrence of said recordation command signal.

The record provided by this system accords with the first above-discussed recordation format requirement where said first means generated signals are MT/ST-encoded, accords with the second format requirement where said recordation command signals are periodic and tape advance is continuous and of constant rate, and accords with the third format requirement, during generation of said first means signals and record movement, by operation of said second and third means and, alternatively, during nongeneration of said first means signals and record movement, by operation of said fourth and fifth means. By virtue of such alternative parity bit-entering means, precise incremental record movement is not demanded and simple unbraked constant speed tape transport means may be employed whereby a low cost and small sized system adapted for direct field deployment is provided.

The foregoing and other objects and features of the invention will be evident from the following detailed description of preferred embodiments thereof and from the drawings wherein like reference numerals represent like elements throughout.

DESCRIPTION OF THE PREFERRED EMBODIMENTS

Figure 1:
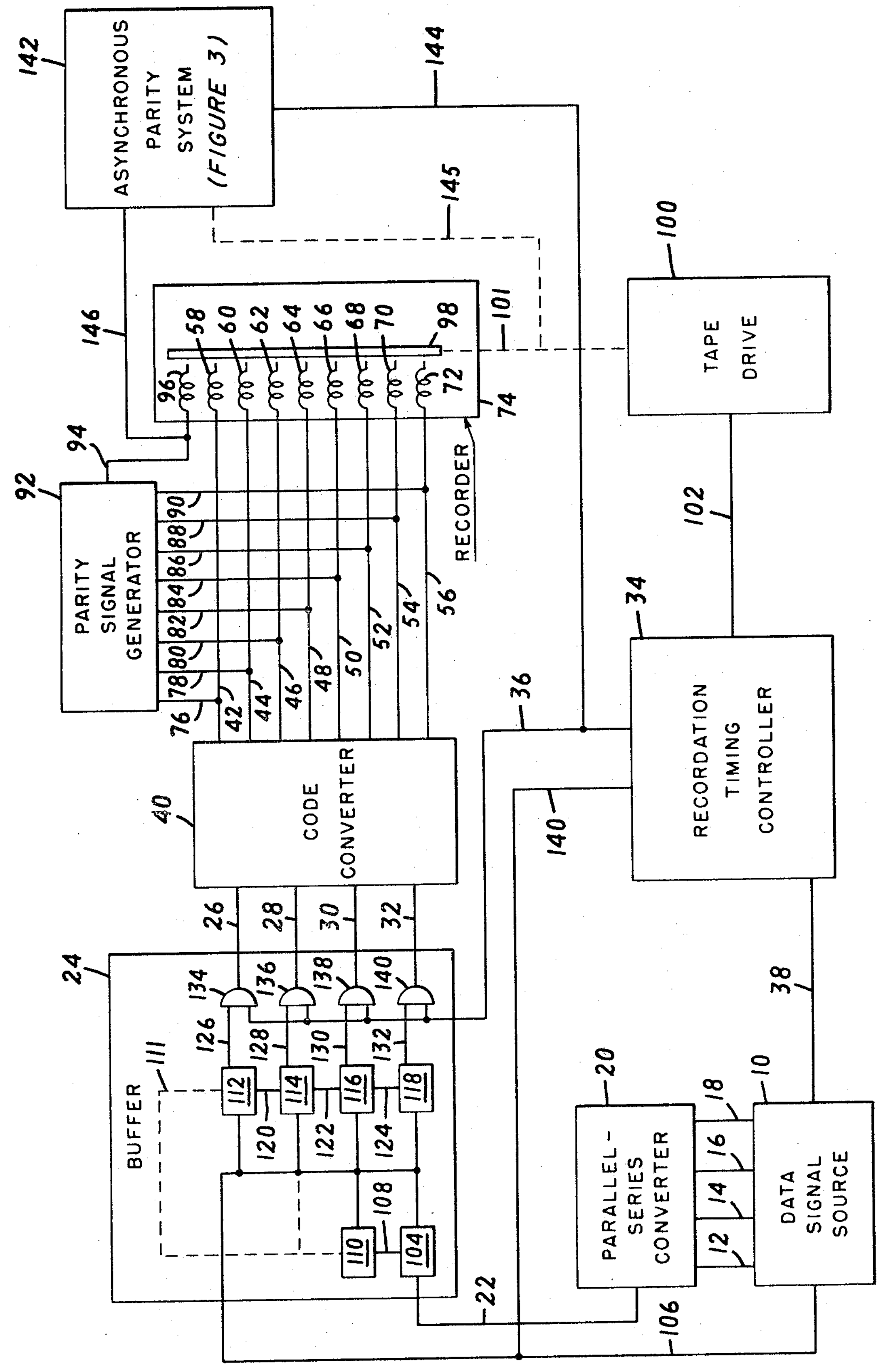
FIG. 1 is a block diagrammatic illustration of a recording system in accordance with the invention.

Referring to FIG. 1, the recording system therein comprises an asynchronous data signal source 10 providing non-MT/ST-encoded output signals, the character or auxiliary information content of which is to be entered into a digital computer operating exclusively upon MT/ST-encoded input signals. Source 10 is preferably a keyboard having first keys representing the natural numbers, one through nine, and zero or other characters and second keys representing auxiliary information such as "end of field," "end of word," and "end of file." Source 10 provides parallel readout of signals generated in response to keyboard operation on lines 12, 14, 16 and 18, said signals indicating character and auxiliary information content in accordance with the code of source 10. An exemplary code for source 10 is discussed below in connection with table I. These signals are applied to parallel-series converter 20 which is adapted to serialize same. Thus, converter 20, typically a parallel input shift register, provides on output line 22 a pulse train selectively indicative of said information content of source 10 output signals.

In definition of terms used herein in conjunction with various data entries, data word is intended to describe a grouping of individual bits, which may be either one of said auxiliary informations or one or a plurality of said characters terminated by said end of word auxiliary information. Succession of data words constitute the data message and same is terminated by said end of file auxiliary information. A data word may contain therewithin groupings of bits representative of characters, such groups being separated by said end of field auxiliary information. The number of bits per word and the number of words per message will vary in accordance with the information content to be recorded and, in general, with respect to the application to which the recording system is applied.

The output signals of converter 20 are applied to store and readout buffer 24, the function of which is to store asynchronously occurring four-bit keyboard data entries until a data message is collected in its entirety whereupon such message may be made available synchronously on buffer output lines 26, 28, 30 and 32. Recordation timing controller 34 provides recordation command signals over line 36 to initiate and continue buffer 24 readout. In order to discontinue application of line 22 signals to buffer 24 during buffer readout, the timing controller also provides an output signal over line 38 to source 10 adapted to provide suitable indication to source 10 operator that keyboard manipulation should be discontinued temporarily until completion of buffer 24 readout.

The output signals of buffer 24 on lines 26 through 32 are applied to code converter 40 which is adapted to translate input signals into the MT/ST code. Converter 40 provides its output signals on lines 42 through 56 thereof. The converter is responsive to each signal pattern (other than all zeros) appearing upon its input lines to provide an eight-bit signal pattern which is applied to recording heads 58 through 72 of recorder 74. Such eight-bit signal pattern is also applied in parallel over lines 76 through 90 to parity signal generator 92. This unit is responsive to such applied signal pattern to generate a parity signal on output line 94 thereof for application to a further recording head 96 of recorder 74. The signals applied to recording heads 58 through 72 and 96 are impressed upon recording tape 98 which is advanced by tape drive 100 through mechanical linkage 101. Tape drive 100 is energized by timing controller 34 by signals generated on line 102.

In a typical example of operation of the system thus far discussed, the operator of data signal source 10 depresses a character key, indicative of the numeral six, for purposes of ultimately entering inventory or like information in a digital computer. Lines 12 through 18 selectively exhibit a pattern of HI or LO voltage levels. Typically a HI (one) level of +5 volts and a LO (zero) level of ground are employed. A non-MT/ST code, such as that set forth in table I below, is employed through the agency of appropriate key-operated switching matrix to generate the respective signal pattern on lines 12 through 18.

TABLE I

| | Line | | | |
|---|---|---|---|---|
| Character | 18 | 16 | 14 | 12 |
| one | 0 | 0 | 0 | 1 |
| two | 0 | 0 | 1 | 0 |
| three | 0 | 0 | 1 | 1 |
| four | 0 | 1 | 0 | 0 |
| five | 0 | 1 | 0 | 1 |
| six | 0 | 1 | 1 | 0 |
| seven | 0 | 1 | 1 | 1 |
| eight | 1 | 0 | 0 | 0 |
| nine | 1 | 0 | 0 | 1 |
| zero | 1 | 0 | 1 | 0 |
| Auxiliary Information | | | | |
| end of field | 1 | 0 | 1 | 1 |
| end of word | 1 | 1 | 0 | 0 |
| end of file | 1 | 1 | 0 | 1 |

In the specific example, the signal pattern 0110 indicative of the numeral six is generated by source 10 and applied over lines 12 through 18 to converter 20. Line 22 will provide the serial pulse train of 0110 and same is applied to the initial storage element, e.g., a multivibrator, 104 of buffer 24. Also applied to element 104 are signals provided over line 106 by source 10. These latter signals are provided for purposes of gating signals on line 22 into the buffer and means are incorporated in source 10 for generating a succession of four clock pulses upon each key operation such that the four-bit pulse pattern may be entered into the first four storage elements of the buffer. Upon occurrence of the first clock pulse, element 104 assumes the state LO in accordance with the first bit of said four-bit data pattern. Such state of element 104 is applied over line 108 to the next succeeding buffer storage element 110 and is entered therein upon the occurrence of the next successive clock pulse in said four clock pulse succession, element 104 at the same time assuming a state in accordance with the second bit of said four-bit pattern. Buffer serial storage elements intermediate element 110 and element 112 are omitted for brevity, as indicated by dotted line 111 elements 112, 114, 116 and 118 being the terminal four serial storage elements in buffer 24. These elements are interconnected by lines 120, 122 and 124 and apply their output signals over lines 126, 128, 130 and 132 to first inputs of a plurality of AND-gates 134, 136, 138 and 140, the second inputs to said AND gates being derived in common from line 36, which as discussed below exhibits a LO voltage level throughout buffer loading.

As the operator continues his depression of keys, buffer 24 will achieve full data word capacity, same depending upon the format of source 10, i.e., the number of bits in each word, and upon the bit storage capacity of buffer 24 i.e., the number of individual storage elements therein. The detection of such capacity condition of buffer 24 may be provided by operator count or by automated counting means providing an indication of the condition. Upon occurrence of the condition, it is desired to initiate continuous readout of the buffer contents and impression thereof on recording tape 98. Thus, upon such capacity indication, recordation timing controller 34 is operative to generate a succession of recordation command gating signals on line 36. A further plurality of shifting clock pulses is generated by the controller over line 140, same providing for the continual shift of stored information into the readout storage elements 112 through 118. At the same time, indication is provided over line 38 as mentioned above, to insure that the operator will not depress character or auxiliary information keys.

Upon the occurrence of each recordation command gating signal on line 36, the contents of readout storage elements 112 through 118 are gated through to buffer output lines 26 through 32 and the signal pattern provided thereby is translated into the MT/ST code by converter 40. The MT/ST code is set forth below center in table II. At the right margin of the table, odd-parity is indicated such that the entire table indicates said nine-bit code. In the specific example under consideration, converter 40 will generate the signal pattern 11000000 respectively on output lines 42 through 56.

Table II

| Character | Line 42 | 44 | 46 | 48 | 50 | 52 | 54 | 56 | 94 |
|---|---|---|---|---|---|---|---|---|---|
| one | 0 | 0 | 0 | 1 | 0 | 0 | 0 | 0 | 0 |
| two | 1 | 0 | 0 | 0 | 0 | 0 | 0 | 0 | 0 |
| three | 1 | 0 | 0 | 1 | 0 | 0 | 0 | 0 | 1 |
| four | 0 | 1 | 1 | 1 | 0 | 0 | 0 | 0 | 0 |
| five | 0 | 1 | 0 | 0 | 0 | 0 | 0 | 0 | 0 |
| six | 1 | 1 | 0 | 0 | 0 | 0 | 0 | 0 | 1 |
| seven | 0 | 1 | 0 | 1 | 0 | 0 | 0 | 0 | 1 |
| eight | 1 | 1 | 0 | 1 | 0 | 0 | 0 | 0 | 0 |
| nine | 1 | 1 | 1 | 0 | 0 | 0 | 0 | 0 | 0 |
| zero | 0 | 1 | 1 |  | 0 | 0 | 0 | 0 | 1 |
| Auxiliary Information | | | | | | | | | |
| end of field | 1 | 0 | 0 | 0 | 0 | 1 | 0 | 0 | 1 |
| end of word | 0 | 0 | 1 | 0 | 0 | 0 | 0 | 0 | 0 |
| end of file | 1 | 0 | 1 | 1 | 0 | 0 | 0 | 0 | 0 |

The MT/ST-encoded signals are applied over lines 76 through 90 to parity signal generator 92. If odd-parity is employed, generator 92 will respond to the signal pattern of the example (numeral six) to generate a HI signal on its output line 94. By odd-parity is meant that each recordation frame on tape 98 contains an odd number of total ones. A computer reading tape 98 will, as discussed above, abort where even parity is detected if the computer requires odd-parity. Whereas the signal pattern provided on lines 42 through 56 was MT/ST-encoded, the signal pattern now applied to recording heads 58 through 72 and 96 is encoded in accordance with said nine-bit code.

Concurrently with generation of the first recordation command gating signal on line 36, controller 34 generates a signal on line 102 for energization of tape drive 100. Tape drive 100 may be of the simplified type, i.e., a constant speed motor, adapted upon energization to advance tape 98 at constant rate and upon deenergization to decelerate with or without assist of braking devices thereby advancing tape 98 at decreasing rates to a standstill condition.

Figure 2:
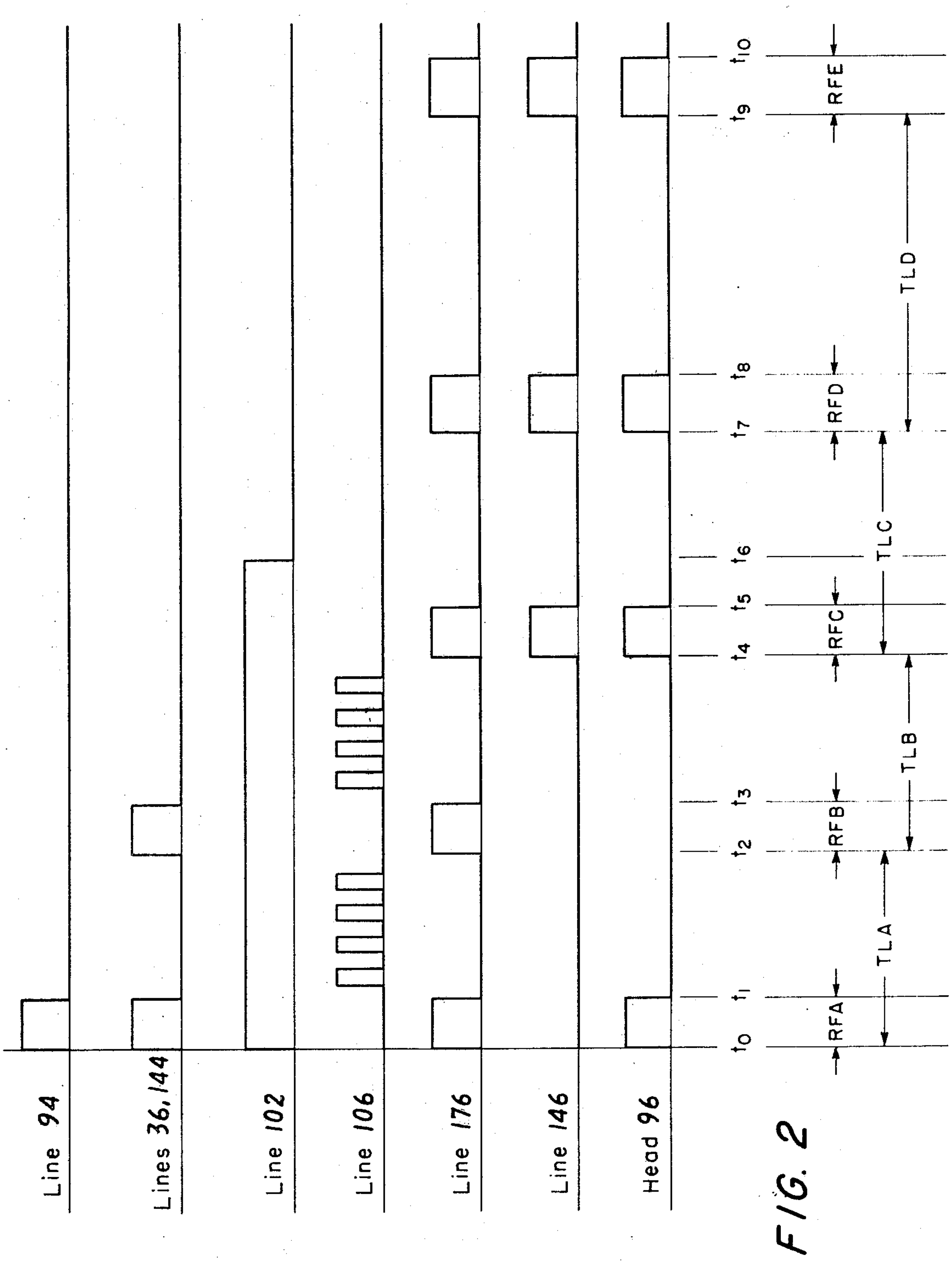
FIG. 2 is a timing diagram indicating the occurrence of certain signals of the recording system of FIGS. 1 and 3.

The operation of recordation timing controller 34 in conjunction with such constant-speed tape drive will be evident from a consideration of the time of occurrence of the various gating and timing signals provided thereby, indicated in FIG. 2. It will be assumed, for purposes of explanation, that said foregoing specific example of system operation wherein signals representative of the numeral six were entered in buffer 24 constituted entry of the final information of the message and that, following same, the operator of source 10 had depressed the key indicative of end of file. It will be assumed further that the contents of buffer 24 have, prior to time $t_0$, been readout with the exception of said signals indicative of the numeral six and end of file indication. With this state of events, storage elements 112 through 118 of buffer 24 contain said signals indicative of the numeral six and apply same over lines 126 through 132 to AND-gates 134 through 140. At $t_0$, a recordation command gating pulse occurs on line 36 effective to apply said signals through the AND-gates to lines 26 through 32. During the time period $t_0$ to $t_1$, line 102 is continuously energized and tape drive 100 is operative to advance tape 98 at said constant rate. Also during such period recording heads 58 through 72 are operative to enter on tape 98 the MT/ST-encoded signal pattern (Table II) generated at lines 42 through 56 and head 96 is operative to enter on tape 98 the parity signal (HI) generated at line 94 in response to said signals applied to lines 26 through 32 (Table II). Since tape 98 moves at constant rate this time period, $t_0 - t_1$, identifies a single recordation frame of precise tape extent which will bear MT/ST-encoded information indicative of the penultimate message entry, the numeral six, and parity bit. At time $t_1$ said gating pulse expires and lines 26 through 32 all assume a LO state, providing the signal pattern 0000 to converter 40, the converter being singularly unresponsive to said signal pattern.

Following time $t_1$ line 140 is selectively energized by controller 34 to provide the four-pulse pattern to line 106 illustrated in FIG. 2. Said pulses, applied over line 140 to the storage elements of buffer 24 are effective to shift the final message entry, i.e., end of file indication, from the four immediately preceding storage elements (not shown) into storage elements 112 through 118. Prior to time $t_2$, the storage elements 112 through 118 thus apply signals indicative of said end of file indication to AND-gates 134 through 140 and upon occurrence of the next succeeding gating pulse on line 36 at $t_2$ these signals are applied to buffer readout lines 26 through 32 and nine-bit encoded signals according therewith are entered upon tape 98 in the next recordation frame. In accordance with table II, no parity signal is generated on line 94 (FIG. 2). The gating pulse on line 36 expires at time $t_3$ and again line 140 is energized with said four-pulse pattern thereby shifting the end of file indication signals out of storage elements 112 through 118 and replacing same with the pulse pattern 0000, such pattern being contained throughout buffer 24 since input line 22 thereof has been LO during the entire readout operation, no signals having been generated by source 10 on line 22 following line 38 energization above. Since converter 40 does not recognize such pattern as a meaningful input pattern and is adapted to be unresponsive thereto, output lines 42 through 56 thereof all assume a LO state. Parity generator 92 is similarly adapted to be unresponsive to the pattern 0000 and provides a continuing LO signal on line 94. After occurrence of said end of file pulse pattern on buffer output lines 26 through 32, timing controller 34 operation is discontinued as respects generation of gating pulses on line 36. AND-gate means (not shown) may be incorporated for detection of such condition (0000) of lines 26 through 32 to provide automatic cessation of controller 34 operation in this respect.

The operation of the system prior to time $t_0$ is repetitive of the above-described recording operation for the exemplary numeral six indication. Thus, recordation command gating pulses periodically occur on line 36 from the time of initiation of a recording mode following said buffer capacity condition and line 102 is continuously energized so long as two recordation command gating pulses occur within the time period therefor, e.g., $t_3 - t_0$, $t_5 - t_2$. Means adapted to provide and discontinue line 102 excitation are incorporated in the timing controller, such as a monostable multivibrator triggered by said gating pulses generated at line 36 and having a settling period slightly in excess of the time period $t_3 - t_0$. In the FIG. 2 timing illustration, a line 36 gating pulse occurs at $t_2$ but does not occur at the time $t_4$, and line 102 excitation is discontinued thereafter at time $t_6$.

Since line 102 continues after recordation of said end of file indication and throughout at least one unrecorded recordation frame, and since tape drive 100 is of the nonincremental nonbraking type, tape 98 will, in the absence of asynchronous parity system 142 discussed below, contain numerous blank recordation frames following the recordation frame in which said end of message indication was entered. As mentioned heretofore, such frames fail to provide proper parity indication, odd-parity requiring that recording head 96 be energized once each recordation frame not containing an odd number of ones. Being energized after time $t_6$, tape drive means 100 will cause tape 98 to travel at other than a constant speed until tape movement ultimately ceases. Thus, said parity requirement cannot be accommodated by mere application of periodically occurring parity signals to line 94. Unlike the periodic recordation frames occurring before time $t_5$, the recordation frames following time $t_6$ occur in nonperiodic manner, successive recordation frames being presented to recorder 74 at increasingly greater time periods as tape drive means 100 coasts to its stop or is coarsely braked.

In explanation of this latter aspect, there are illustrated in FIG. 2 five recordation frames, RFA through RFE. The initiation of each of the recordation frames is spaced from the initiation of succeeding record frames by identical tape lengths. The times of advance of said tape lengths past recorder 74 are indicated as TLA through TLD.

Recordation frames RFA, RFB and RFC all occur during energization of line 102 and thus occur during constant speed tape advance. The result as respects these recordation frames is that the times during which the frames are presented to recorder 74, namely, $t_0 - t_1$, $t_2 - t_3$ and $t_4 - t_5$, are all equal. Similarly, the times between the initiation of one recording frame and the initiation of the next succeeding recording frame are equal, as is indicated by TLA equal to TLB.

Upon completion of presentation of recordation frame RFC to recorder 74 and at time $t_6$, line 102 is deenergized and tape drive means 100 commences its deceleration. As a result, the next succeeding recordation frame RFD is presented to recorder 74 during the time period $t_7 - t_8$ which is larger than the time periods previously discussed for recordation frames RFA through RFC. Similarly, the time period TLC between the time of initiation of recordation frame RFC and recordation frame RFD increases with respect to the time periods TLA and TLB despite that the same length of tape is presented to recorder 74. Such time periods, respectively $t_7 - t_8$ and TLC, are defined by the deceleration characteristics of tape drive means 100 and are substantially unpredictable except as is discussed hereinafter. The time period $t_9 - t_{10}$ of recordation frame RFE and the time period TLD between initiation of recordation frames RFD and RFE are both respectively larger than the corresponding time periods in respect of recordation frame RFD since the speed of advance of tape 98 declines between recordation frames RFD and RFE to a further extent.

Asynchronous parity system 142 of FIG. 1 receives as a first input on line 144 the recordation command gating signals generated by controller 34 on line 36, and as a second input, an indication of tape 98 movement preferably provided by mechanical linkage 145 connected to tape drive means linkage 101. System 142 selectively generates HI signals on output line 146 for application to recording head 96.

The manner of signal generation by system 142 is such that recording head 96 is energized to enter a one in the parity track of tape 98 during all recordation frames presented thereby to recorder 74 during the period commencing with the end of the recordation frame containing said end of file indication and the cessation of advance of tape 98 by decelerating tape drive 100. As will be seen in FIG. 2, line 146 is thus energized with pulses occurring respectively during the recordation frames RFC, RFD and RFE. The energization of recordation frames RFC, RFD and RFE. The energization of recording head 96 to enter ones upon tape 98 will be seen in FIG. 2 to involve a HI signal (pulse) at time $t_0 - t_1$ providing proper parity for the recorded indication of numeral six, a LO signal (no pulse) during the period $t_2 - t_3$ since said recorded MT/ST-encoded end of file indication comprises an odd number of ones (table II), and the three HI signals are provided by system 142 at times $t_4 - t_5$, $t_7 - t_8$ and $t_9 - t_{10}$.

Figure 3:
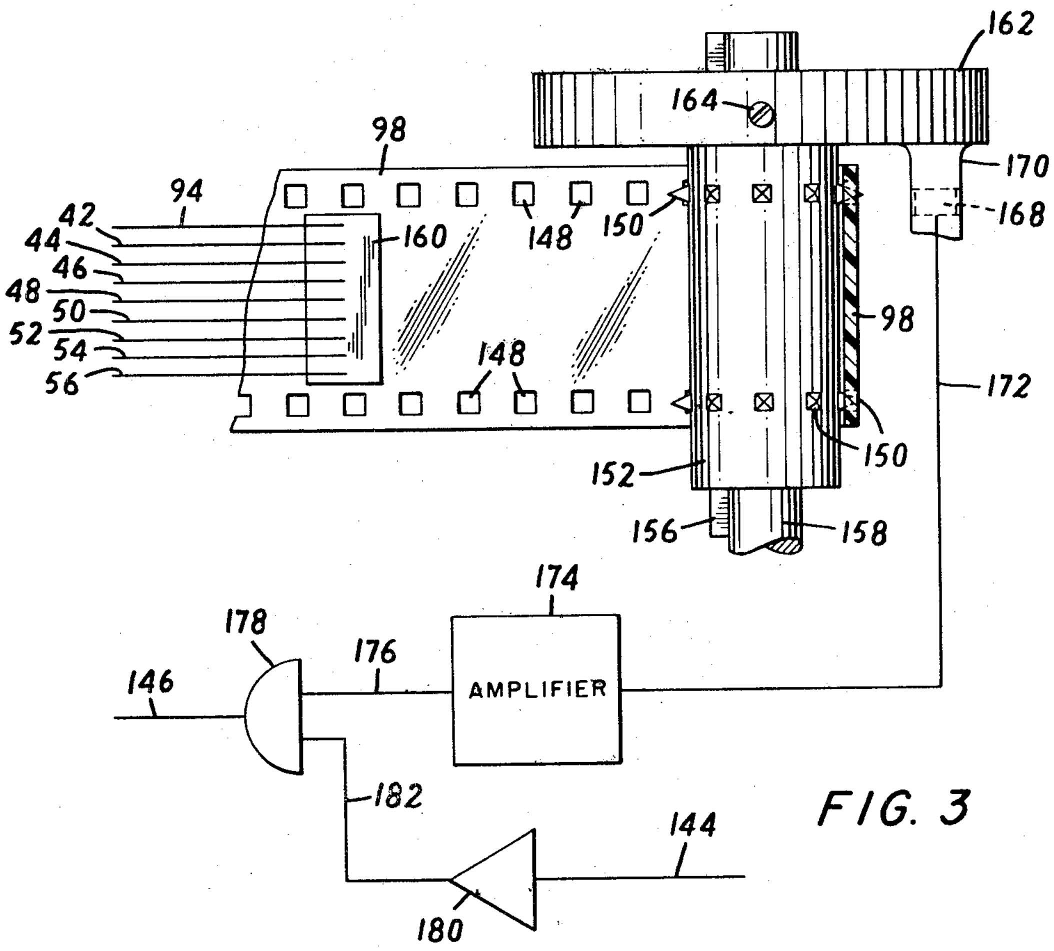
FIG. 3 is a front elevational view of electromechanical apparatus employable in the recording system of FIG. 1 and a block diagrammatic illustration of circuit means used in conjunction with same.
Figure 4:
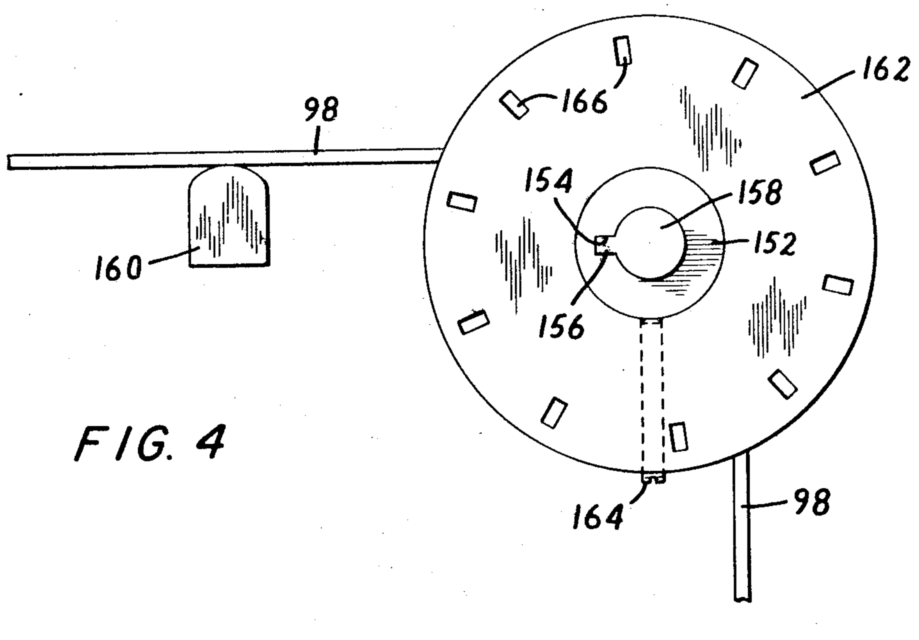
FIG. 4 is a plan view of the apparatus of FIG. 3.

Apparatus and circuitry for asynchronous parity system 142 is illustrated in FIG. 3. Therein tape 98 is illustrated as having marginal perforations 148 at at least one edge thereof, the tape being advanced by engagement of said perforations and the teeth 150 of sprocket 152. The sprocket has an interior slot 154 engaging spline 156 of drive shaft 158. Tape 98 is preferably drawn by sprocket 152 from a cartridge supply reel and is advanced in contact with recording head assembly 160 which presents to the tape recording heads 58 through 72 and 96, excitation for which is provided by lines 42 through 56 and 94. A disc 162 is adjustably secured to the outer periphery of sprocket 152 by set screw 164 or the like.

Disc 162 about the thereof a plurality of apertures 166 for selectively coupling ambient light to photoelectric detector 168, preferably a phototransistor housed within light shield 170. The detector output signals are coupled by line 172 to amplifier 174. The amplifier output is applied over line 176 to one input of AND-gate 178. The aforementioned recordation command gating signals generated by recordation timing controller 34 of FIG. 1 are applied over line 144 to inverter 180, the output of which is applied as a second input to AND-gate 178 over line 182. The AND-gate output is connected to line 146 of FIG. 1.

The number and spacing of apertures 166 is selected such that detector 168 is energized as each recordation frame of tape 98 is driven past recording head assembly 160 during constant speed advance of the tape by drive means 100. Such recordation frames are spaced from one another by a predetermined amount of record movement, i.e., a predetermined lineal extent of tape in accordance with tape packing density considerations. Amplifier 174 preferably includes pulse-shaping circuitry providing a signal on line 176 upon each said energization of detector 168 and of time duration identical with the time duration of said recordation command gating signals provided on lines 36 and 144. Precise time alignment of initiation of signals on lines 144 and 176, as illustrated in FIG. 2, is enabled by adjustment of the positioning of disc 162 with respect to sprocket 152 by release and resetting of set screw 164. Upon such selection of number and spacing of apertures 166 in accordance with said tape packing density considerations and drive 100 constant speed characteristics, and upon such alignment of signals on lines 144 and 176, recording system setup is completed and the following occurrences take place in system 142 in the foregoing exemplary operation of the recording system of the invention.

Throughout the readout of the entire message contained in buffer 24, signals time coincident with line 36 recordation command gating signals are generated by detector 168 and such periodic pulse train occurs as shown on line 176 of FIG. 2 from time $t_0$ to time $t_4$. During this period, line 144 applies an identical pulse train to inverter 180, which in turn provides converse signals to line 182. Thus, where line 144 is HI, indicative of the occurrence of a recordation frame, line 182 is concurrently LO. AND-gate 178 thus continually sees HI diversity in the two input signals applied thereto, i.e., either concurrent LO, LO, or HI, LO, or LO, HI, respectively on lines 176 and 182. Only upon completion of buffer 24 readout and the cessation of line 36 signals after $t_3$, and specifically during the time periods $t_4 - t_5$, $t_7 - t_8$ and $t_9 - t_{10}$, does AND-gate 178 observe correspondence in the HI states of signals on said input lines thereto. AND-gate 178 logic provides for the generation of a HI signal on its output line exclusively upon coincident HI state of both inputs thereto, and thus, as indicated in FIG. 2, line 146 is selectively HI only during said enumerated recordation time frames RFC, RFD and RFE, and more generally, only during all such recordation frames which are presented to recorder 74 until drive means 100 comes to a complete stop.

Referring to recording head 96 energization indication illustrated in FIG. 2, it will be seen that subsequent to the generation of proper parity signals at times $t_0 - t_1$ and $t_2 - t_3$ by generator 92 on line 94 as above discussed, further parity signals are provided by AND-gate 178 upon selective line 146 energization. Proper parity indication is assured precisely in each of recordation frames RFC, RFD, RFE, etc., by reason of the fact that line 146 parity signals are generated in accordance with instantaneous tape advance speed.

Whereas amplifier 174 is preferably provided with pulse shaping circuitry for the purpose of limiting the time duration of line 146 signals, with the result that the line 146 signals may terminate precisely with the times $t_5$, $t_8$ and $t_{10}$ of termination of recordation frames RFC, RFD and RFE, the apertures 166 of disc 162 may be dimensioned to provide equal time duration between line 36 and line 172 signals during constant speed tape advance and the pulse shaping circuitry may be eliminated from amplifier 174. With such dimensioning selection, line 146 signals will precisely define both initiation and end of recordation frames throughout the deceleration of drive means 100.

In the foregoing preferred embodiment of asynchronous parity system 142, disc 162 functions as a light signal generator providing indications of movements of drive shaft 152 according with advances of tape 98 of extents presenting successive recordation frames to recorder 74. Such light signals are converted to corresponding electrical signals by converter 168, which nonperiodic electrical signals provide parity indicating signals for entry in those recordation frames of tape 98 which are presented to recorder 74 and which would not otherwise contain a parity-indicating signal, i.e., those frames which do not contain information-indicating signals provided by converter 40 and associated parity-indicating signals provided by generator 92.

Various other structural implementations of asynchronous parity system 142 will be evident to those skilled in the art. For example, the light signal generation of the preferred embodiment may be substituted for by use of magnetic pieces, electrets or the like, in association with suitable detectors of nonphotoelectric type. As respects the recording system of FIG. 1, the manner of MT/ST-encoded signal generation, provided therein by particularly functioning cooperative elements 10, 20, 24 and 40, may also be varied to accommodate application of the invention to other environments. In light of such variations, changes and modifications, the foregoing preferred embodiments are intended in a descriptive and not in a limiting sense.

Since the system and apparatus of the invention provides the aforementioned recordation format characteristics and does not require said costly, complex and sizeable electromechanical incremental tape advance apparatus, portable magnetic tape recorders may be readily provided for various applications having cost limitations. For instance, heretofore, cash register keyboarded data has generally been recorded either by magnetic tape units or punched paper tape units at the register location, neither of such records providing said recordation format characteristics. These records are subsequently processed by associated apparatus mentioned above and entered into computers in said recordation format through use of fixed location incremental tape advance apparatus. In contrast, a recorder in accordance with the invention may be introduced directly in the cash register and keyboard-operated through the simplified associated apparatus of FIG. 1 to provide a record directly readable by a computer or enterable by readout at the cash register location and transmission to the computer through a modulator telephone-demodulator channel.

Whereas discussion of exemplary operation has involved odd-parity as said third recordation format characteristic, the system of the invention is evidently applicable where even-parity records are required. In this connection, since totally blank recordation frames are interpreted as errors by computers for which records are prepared, it is necessary that a one be entered in the parity track for each unrecorded recordation frame as discussed in the foregoing odd-parity example, and that a further one be dummy-entered in one of the other tracks. With such recordation frame, the computer will detect proper (even) parity and then, by appropriate programming, will discard said dummy entry as not constituting information intended to have meaning and to be applied to computer memory.

What is claimed is:

1. A system providing a multitrack record inclusive of a parity indication track comprising:

a. first means operatively responsive to a recordation command signal to generate signals indicative of character and auxiliary information;
b. second means generating a parity signal in accordance with said first means generated signals;
c. third means applying said generated parity signal to said record parity indication track and applying said first means generated signals to other record tracks;
d. fourth means sensing movements of said record and generating output signals each indicative of record movement of a predetermined extent; and
e. fifth means selectively applying said fourth means output signals to said record parity track upon occurrence of same and concurrent nonoccurrence of said recordation command signal.

2. The system claimed in claim 1 wherein said predetermined extent of record movement is the lineal extent of tape between successive recordation frames presented by said record to said third means for said signal applications thereto.

3. The system claimed in claim 1 further including record drive means adapted to maintain said record in continuous constant speed movement during occurrence of a succession of said recordation command signals and to unbrakingly decelerate upon nonoccurrence of said recordation command signals.

4. The system claimed in claim 1 wherein said first means generated signals are MT/ST-encoded.

5. The system claimed in claim 1 wherein said first means includes a source generating output signals indicative of said character and auxiliary information at an asynchronous rate and buffer means adapted to store said source output signals and regenerate same at a synchronous rate.

6. The system claimed in claim 5 wherein said source output signals are non-MT/ST-encoded, said first means further including encoding means receiving said regenerated source signals and MT/ST-encoding same.

7. A system for entering parity-indicating signals in otherwise blank recordation frames of a record in movement comprising first means generating output signals indicative of occurrence of recordation frames having entered therein parity-indicating signals and other information-indicating signals, and second means generating an output signal for each recordation frame indicative of the occurrence thereof, and third means receiving said first and second means output signals and adapted to enter parity-idicating signals in said record upon occurrence of said second means output signals and concurrent nonoccurrence of said first means output signal.

8. The system claimed in claim 7 further including fourth means moving said record, wherein the initiations of said recordation frames are equally spaced along the length of said record and wherein said second means is operatively responsive to said fourth means in said generation of signals indicative of the occurrence of all recordation frames.

9. The system claimed in claim 8 wherein said fourth means provides constant speed movement of said record during recordation of said recordation frames having entered therein parity-indicating signals and other information-indicating signals and nonconstant speed movement of said record during recordation of others of said recordation frames.

10. The system claimed in claim 9 wherein said fourth means includes a rotating drive shaft in contact with said record, said second means comprising a signal generator adapted to sense rotational movement of said drive shaft and to provide said second means output signals upon sensing predetermined rotational movements of said drive shaft.

* * * * *